United States Patent [19]

Alvarez et al.

[11] 3,761,883

[45] Sept. 25, 1973

[54] STORAGE PROTECT KEY ARRAY FOR A MULTIPROCESSING SYSTEM

[75] Inventors: Joseph A. Alvarez, Monrovia; Robert P. Barner, Jr., Rockville; Robert J. Hallett, College Park, all of Md.

[73] Assignee: International Business Machines Corporation, Armonk, N.Y.

[22] Filed: Jan. 20, 1972

[21] Appl. No.: 219,361

[52] U.S. Cl. .......... 340/172.5

[51] Int. Cl. .......... G11c 7/00, G08b 29/00

[58] Field of Search .......... 340/172.5

[56] References Cited

UNITED STATES PATENTS

| | | | |
|---|---|---|---|
| 3,473,159 | 10/1969 | Cantrell | 340/172.5 |
| 3,465,297 | 9/1969 | Thomas et al. | 340/172.5 |
| 3,461,433 | 8/1969 | Emerson | 340/172.5 |
| 3,576,544 | 4/1971 | Cordero, Jr. | 340/172.5 |
| 3,328,765 | 6/1967 | Amdahl et al. | 340/172.5 |
| 3,328,768 | 6/1967 | Amdahl et al. | 340/172.5 |
| 3,317,902 | 5/1967 | Michael | 340/172.5 |
| 3,284,776 | 11/1966 | Friedman | 340/172.5 |

*Primary Examiner*—Paul J. Henon
*Assistant Examiner*—Paul R. Woods
*Attorney*—J. Jancin, Jr. et al.

[57] ABSTRACT

A mechanism is described which retains a copy of a selected portion of the storage protect keys at each local storage buffer in a multiprocessing system. The mechanism reduces the amount of hardware required to retain the keys at the local buffer but allows for immediate modification of a key upon execution of a set storage key instruction.

3 Claims, 5 Drawing Figures

STORAGE PROTECT KEY ARRAY FOR A MULTIPROCESSING SYSTEM

BACKGROUND OF THE INVENTION

This invention relates generally to the field of digital computers and more specifically, to the area of memory protection within a computer.

In digital computers, such as the IBM System/360, storage protection is provided by dividing the main storage into storage protect areas. Each storage protect area contains 2,048 contiguous bytes of storage and begins on a boundary a multiple of its size. A five bit key is associated with each storage protect area. The key is used to establish the right of access to a storage protect area by comparing the key in storage to a protection key. The protection key in the current program status work is used as the comparand if the operation is specified by an instruction. If the reference is specified by a channel operation, the protection key in the channel address word (CAW) is used as the comparand.

The multiprocessing system environment for applicants' invenion is described in the copending, Alvarez et al. U.S. Pat. application, Ser. No. 219,362, filed on Jan. 20, 1972, which discloses and claims a hierarchial memory system with logical and real addressing. Another example of a multiprocessing system environment for applicants' invention is the copending Barner et al., U.S. Pat. application, Ser. No. 179,376 filed on Sept. 10, 1971, which pertains to a memory control in a multiprocessing system utilizing a broadcast function.

In a system with a storage hierarchy, selected blocks of data from main storage are stored in a local buffer for fast access by the CPU. Storage protection must be afforded this data since it is simply a local copy of a portion of main storage.

One prior art method for retaining the keys for locally buffered storages of a multiprocessor has been to maintain the complete set of keys in an array. Bits $P_1$ thru $P_2$ of a 24 bit address (shown in FIG. 1) identify the block of storage which is to be searched for in the local buffer. Bits 8–20 of the address identify the storage protect area in which the block lies. The associated key is obtained from the array by identifying its location with bits 8–20 of the address.

Utilizing this prior art method in a multiprocessing system, each local buffer would be accompanied by a complete set of keys. If the amount of main storage attached to the system is large, the amount of array storage required to retain the keys becomes excessive. For example, some systems provide for up to 16 instruction counters in a system and a $2^{24}$ or $2^{31}$ byte address space. Retaining the keys in this prior art method in the system with a $2^{24}$ byte address space would require $2^{13}$ five bit key storage locations for each local buffer in the system. With a $2^{31}$ byte address space $2^{20}$ five bit key storage locations would be required for each local buffer in the system.

A second prior art method retains a key for each block of data stored in the local buffer. The amount of array storage required to retain the keys is relatively small. Difficulties inherent in this second prior art method are apparent when the instruction SET STORAGE KEY (SSK) is employed to change the key associated with a storage protect area of main storage. If a block of data in the local buffer was fetched from the storage protect area identified by a SSK, the key associated with that block must be set according to the SSK.

A description of the SSK instruction appears in "A Programmer's Introduction to the IBM System/360 Architecture, Instructions, and Assembler Language," published in 1967 by the International Business Machines Corporation.

As shown in FIG. 2 when this second prior art method is used keys are mapped into the key array by the same field ($P_1$ thru $P_2$) of the address which maps blocks of data from main storage into the local buffers. The field of the address which controls this mapping and the field which identifies the storage protect area are not the same.

In order to respond to the SSK instruction, $2^x$ positions of the local buffer ($x=P_2-21$) must be searched in order to determine whether a block from the storage protect area identified by the SSK is resident in the local buffer. This search results in an degradation of system performance.

In light of the above described problems in the prior art it is a primary object of this invention to develop an apparatus with improved system performance.

It is another object of this invention to develop an improved storage protect key array which only requires the accessing of one array position when a set storage key instruction is executed.

It is a further object of this invention to develop an improved storage key array organization which will reduce hardware requirements over prior art systems.

It is a further object of this invention to develop an improved storage protect system where the storage protect keys resident in the local buffer are a function of the data stored within that buffer.

It is a still further object of this invention to reduce the number of storage protect keys that are required to be resident in a local buffer.

It is a further object of this invention to store only selective storage protect keys in the local buffer.

SUMMARY OF THE INVENTION

The above identified objects of the present invention are achieved by maintaining a complete set of keys in the main storage or any other commonly accessible location. Copies of the keys from a selected number of the storage protect areas are maintained in a key array. A separate key array is associated with each local buffer in the multiprocessing system.

When a block of data is fetched into the local buffer from main storage, the key associated with that block is entered into the key array. The row of the key array into which the key is placed is defined by bits $k_1$ thru 20 of the address. Bits 8 thru ($K_1-1$) of the address are entered along with the key.

Each access of the local buffer is accompanied by the fetch of an entry from the key array. Bits $k_1$ thru 20 define the entry to be fetched. Bits 8 thru $k_1-1$ of the address are compared to the address field contained in the key array. A match indicates that the key obtained is the key associated with the storage protect area desired. A mismatch must be followed by a fetch of the block of data and its key from main storage.

In this manner effective retention of the keys is accomplished with relatively few key array locations per local buffer. For example, a key array of $2^6$ locations can maintain the keys on $2^{17}$ bytes of storage—generally a much larger portion of storage than may reside in the local buffer. Additionally, changing the key associated with the storage protect area specified by a SSK instruction is accomplished by fetching the one location of the key array into which that storage protect area could be mapped. If the entry contains a key for the storage protect area specified by the SSK, the key in that entry is changed to that specified by the SSK. If the entry does not contain a key for the storage protect area specified by the SSK, the entry remains unchanged.

These and other objects, advantages and features of the present invention will become more readily apparent from the following specification when taken in conjunction with the drawings.

DESCRIPTION

Figure 3:
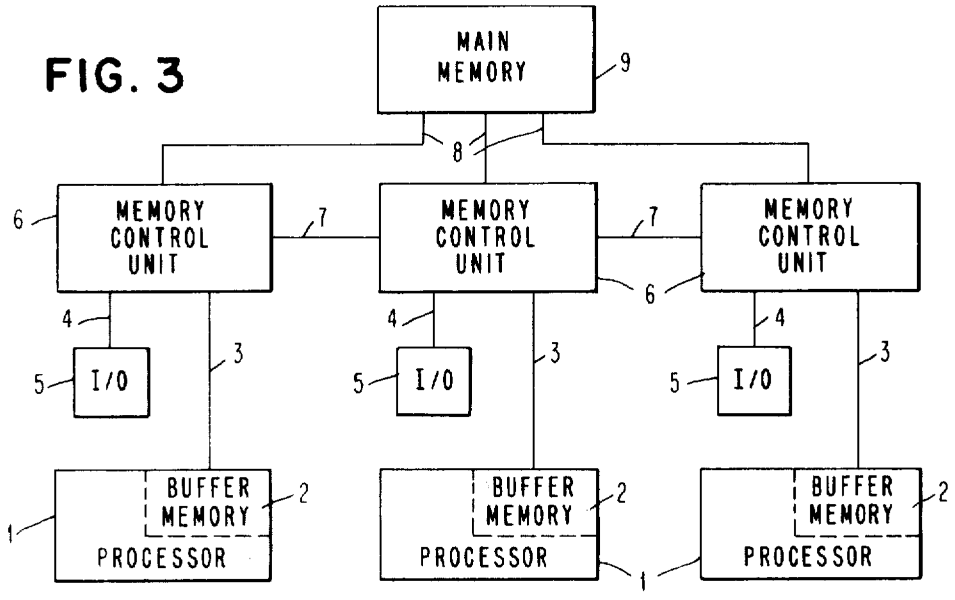
FIG. 3 shows a schematic diagram of the data processing system which employs the present invention.

Referring to FIG. 3, a multiprocessing system of the form contemplated by the present invention includes a plurality of processors 1, each containing its own buffer memory 2. Each of these processors 1 is connected by its bus 3 to a memory control unit 6. Memory control unit 6 controls access and priority of service to the connected I/O unit 5 over a bus 4 and the buffer memories 2 over bus 3. Additionally each of the memory control units 6 is connected to every other one by an intercontrol unit bus 7. Each of the memory control units is also connected to the main memory 9. It should be noted that the processor 1 described in this invention could be a single uniprocessor as well as a more complex pipeline processor that is simultaneously processing a plurality of instruction streams with the instruction streams sharing the resources of the buffer memory 2.

Figure 4:
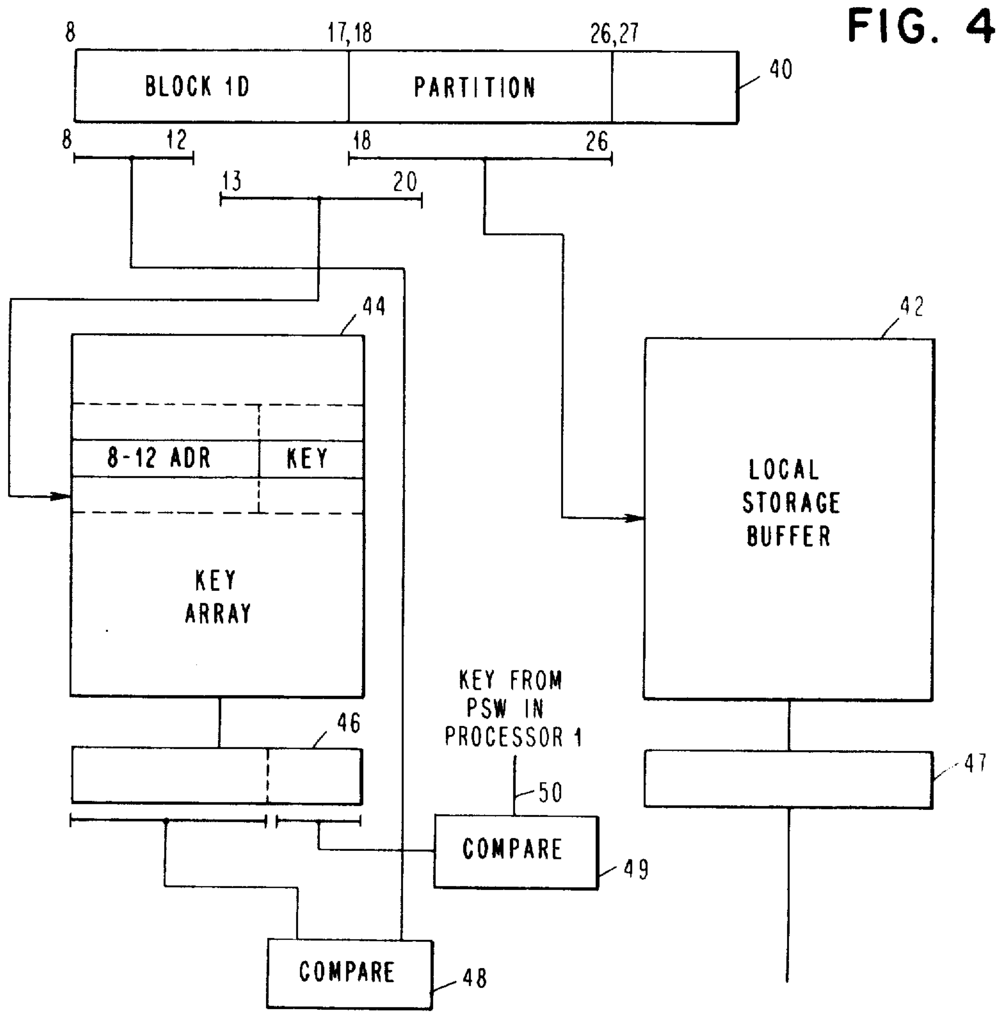
FIG. 4 shows a schematic diagram of the apparatus that is utilized in the present invention with the buffer memory 2.

FIG. 4 will now be referred to in order to describe the inventive apparatus which is utilized by the present invention within the buffer memory 2 of FIG. 3. Generally, the buffer memory 2 is designed to support the processor 1 by providing storage functions at a speed much greater than that of the main memory 9. The local storage buffer 42 provides the means to store the desired data. For the purposes of this description it will be assumed that the local storage buffer 42 is a one way set associative memory. It should be noted that one of the characteristics of a one way set associative memory is that the partition represents a direct mapping between the buffer memory 2 and the main memory 9. A block in main memory 9 may reside in only that one block segment for that partition in the local storage buffer 42. It will be clear to those skilled in the art that many types of mapping schemes may be employed in the buffer memory 2 and that this invention is not restricted to this type of mapping. Data outputted from the local storage buffer 42 is gated into local storage output register 47 which provides a means to receive the data that has been addressed from the local storage buffer 42.

Addresses are received by the buffer memory 2 in the buffer address register 40. For the purposes of this description it will be assumed that all the addresses received by the buffer address 40 are real addresses. It will be clear to those skilled in the art that these addresses might also be logical addresses which will require some form of address translation. However, since the translation of addresses might be accomplished in many ways, known to those skilled in the art, and since address translation is not a part of the present invention this translation will not be discussed. Suffice it to say that the address translation has been accomplished and only real addresses are received by the buffer address register 40.

Figure 5:
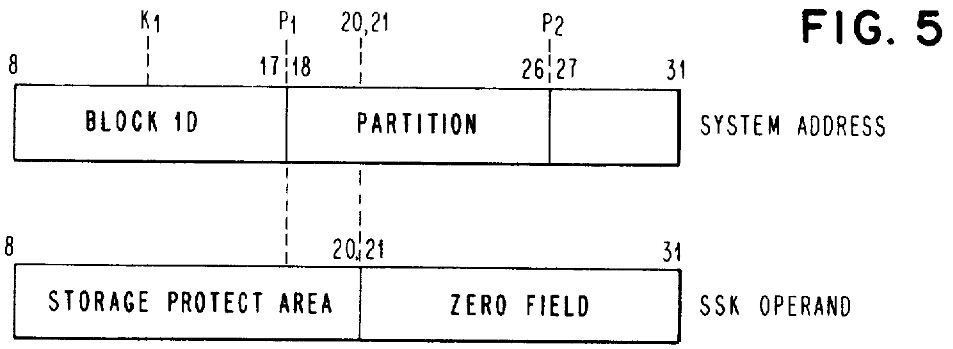
FIG. 5 shows a diagram of the format of the address and SSK instruction utilized in the present invention.

As shown in FIG. 5 the system architecture of the present embodiment utilizes a system address, bits 8–31, which identifies the block by bits 8–17, the partition by bits 18–26, and the bytes by bits 27–31.

Bits 13–20 of the address contained in buffer address register 40 are connected to key array 44. Key array 44 provides the means of storing the storage protection keys of the data contained within the local storage buffer 42. Each entry in the key array 44 is identified by bits 8–12 of the address of the data in the local storage buffer 42 to which it corresponds. Additionally each entry in the key array 44 contains the five bit storage protection key along with the address bits 8 thru 12 of the address of data to which it corresponds. Each entry of the key array 44 is stored in the location which corresponds to bits 13–20 of the address for which the storage key corresponds. Therefore, bits 13–20 of the address contained within the buffer address 40 are utilized as a pointer to the one location in which the storage protection key corresponding to the desired data within the local storage buffer 42 might be located.

Connected to the key array 44 is the key array output register 46 which provides a means for outputting the data of the key array 44. The bits corresponding to bits 8–12 of the address stored within the key array which have been outputted to the key array output register 46 are connected to compare 48. Also connected to compare 48 are bits 8–12 of the address contained within the buffer address 40 with the bits 8–12 of the address which has been read out of the key array 44 into the key array output register 46.

The portion of the key array output register 46 which contain the storage protect key are connected to compare 49. Also connected to compare 49 is line 50 which provides the storage protect key from the program status work (PSW) which is contained in processor 1 for the particular program that is being executed. Compare 49 compares the PSW key from processor 1 with the key in the key array output register 46.

Figure 1:
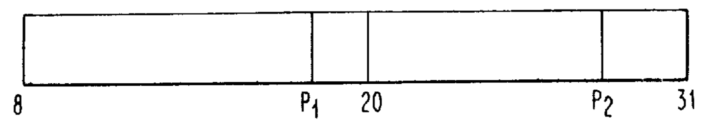
FIG. 1 (PRIOR ART)
FIG. 1 shows a diagram of the format of the address used in a prior art system.
Figure 2:
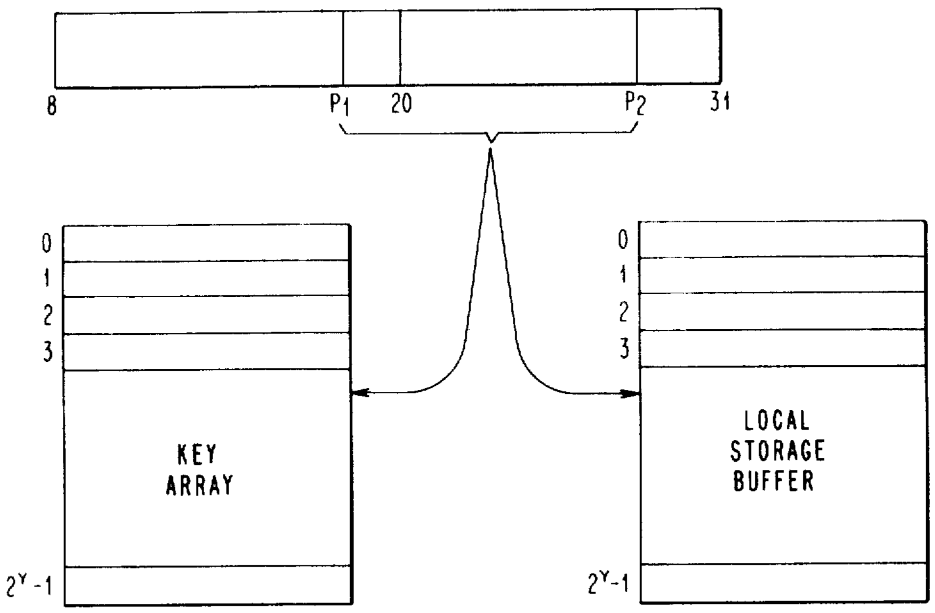
FIG. 2 (PRIOR ART)
FIG. 2 shows a schematic diagram of another prior art system.

At this point, it should be noted that when a set storage key (SSK) instruction is executed an SSK operand will be inputted into the buffer address register 40. The operand comprises a storage protect area that is specified by bits 8–20 and the zero field bits 21–31. It should be noted at this point that the storage protect area bits 8–20 of the SSK operand do not correspond to the bits that are utilized to map the keys into the array under the prior art methods. In the prior art methods the partition is utilized to map in the keys. That is, bits $P_1$ to $P_9$ of FIGS. 1 and 2. Therefore, if there is no overlap between the partition fields of FIG. 1 and 2 ($P_1$ to $P_9$) and the storage protect area specified by the SSK (bits 8–20) every location in the key array must be searched to determine if its entry is affected by the SSK operand. If there is overlap between these fields the number of locations in the array that must be checked is reduced by a factor of two for each bit of overlap. But a unique location is not specified unless there is total overalp.

This problem of the prior art techniques is overcome in the present invention by mapping the storage protect keys into the key array 44 utilizing a field of the system address (bits 13–20) which also corresponds to a portion of the memory protect area as opposed to the address partition (bits 18–26 generally) that was utilized by the prior art methods. How this is specifically accomplished will become obvious during the discussion of the system operation.

OPERATION

The operation of the present invention will now be described utilizing the apparatus of FIG. 4. When a block of data is fetched into the buffer memory 2 it is stored into local storage buffer 42 from main memory 9 and the storage protection key associated with that block is entered into the key array 44 along with bits 8–12 of the address corresponding to that block of data. The row of the key array 44 into which the key is placed is defined by bits 13–20 of the address of the block of data.

Each access of the data within the local storage buffer 42 is accompanied by the fetch of an entry from the key array 44. This is accomplished by inputting the address of the desired data into buffer address register 40. Bits 13–20 of the address within the buffer address register 40 define the entry to be fetched from the key array 44. These bits are used as a pointer to fetch the appropriate entry from the key array 44. The appropriate entry is output from the key array 44 into the key array output register 46. Bits 8–12 of the entry which has been outputted into the key array output register 46 are then compared in compare 48 with bits 8–12 of the address contained within the buffer address register 40. If a match occurs this indicates that the key obtained is the key associated with the storage protect area identified by the address. A mismatch, however, indicates that the key is not the one desired. In this case a fetch of the block of data and its key must be initiated form main memory 9 in a normal manner well known to those skilled in the art. keys would be accomplished with relatively few key array locations pcr local buffer.

While the invention has been particulArly shown and described with reference to the preFerrd embodiment thereof, it will be understooc by those skilled in thc art that various changes In form an: details may be made thereiO witheut depaRting from the sPirit an: Pcope ofthe invention.

We claim:

1. In a multiprocessing system with a data storage hierarchy, a plurality of processors for processing data, a main memory connected to each of said plurality of processors and divided aa plurairty of storage protect areas, a plurality of storage pRotect kPys each of which is asociated with one of said storage protect Areas in mAin memory, and a plurality of apparatuses for retaining stoRage protectkeys, wheRelneach saldapa-rAtFs is connected to a corresponding one of said processors,and wheReun eAc said apparatus comprises:

address receiving means connected to its corresponding processor foR Re,elvinG Addrzssee efdata desired and instructions; fo retaining blocks of data stored in said main memry;

key aray means connected to said address receivi means for retuining an entry for each of said blocks of data retained in said local torage means, each entry containing the storage protect key corresponding to that block of data retained in said local storage mens, and a porion of the address ,oRrP-spoto tut block Of data retained in said local stoRage means;

comparison means connected to said address receiving means anz SaId key array means for comparing the portion of address in the key array entry witY thz corrzsoPoRtion Of the addRess in said 9receiving means to determine by the aforesaid comparing function whether the storage protect key associated with the data represented by the addreSs i sai-daddRess receiving means, is resident in said key array

2. The apparatus of claim 1 whereinmeans are provided to address a key array entry within said key array means by the portion of the address in the address receiving meAns less that portion resident in the key array entry.

3. The apparatus of claim 2 wherein the area of said main memory specified by the storage protct area of a set storage key instruction is the portion of the address tYaJ us utilized to identify means.

In the event the key is resident in the key array 44, i.e., there is a match in compare 48, the key that is resident in the key array output register 46 is compared with the key contained in the program status word (PSW) for that particular program in compare 49. The key from the PSW is obtained from the processor 1 in a manner well known to those skilled in the art. If a comparison is achieved in the compare 49 the program may access the data represented by the address in buffer address register 40. If a comparison is not achieved it may not access this data.

In the event that a set storage key (SSK) instruction is to be accomplished the operation is carried out in the following manner. The operand is inputted into buffer address register 40. Bits 13–20 of the contents of buffer address 40 are utilized as a pointer to the one location within the key array 44 in which the appropriate key might be stored. The entry within the key array 44 indicated by the pointer designated by bits 13–20 of the contents of buffer address register are outputted to key array output register 46. Bits 8–12 of the entry that has been outputted into key array output register 46 are then compared with bits 8–12 of the contents of the buffer address register 40 in order to determine whether there is a comparison within compare 48. If there is a comparison within compare 48, that is, if the entry contains a key for the storage protect area specified by the SSK, the key in that entry is changed to that specified by the SSK instruction or invalidated. If the entry does not contain a key for the storage protect area specified by the SSK instruction, that is, there is not a comparison within compare 48, the entry remains unchanged.

Although the above description has been directed to a specific embodiment of the invention it is possible to generalize the approach that has been taken in the present invention in order to affect the retention of the storage protection keys with relatively few key array locations. This might be best described by referring to the format of the system address and the SSK instructions contained in FIG. 5. As shown in FIG. 5 the row of the key array into which the key is placed might be defined by bits $k_1$ thru 20 of the address. Bits 8 thru ($k_1-1$) of the address could be entered along with the key.

Each access of the local buffer would be accompanied by a fetch of an entry from the key array. Bits $k_1$ thru 20 would define the entry to be fetched. Bits 8 thru $k_1-1$ of the address would then be compared to the address field contained in the key array 44. A match would indicate that the key obtained is the key associated with the storage protect area identified by the address. A mismatch would indicate that the key is not the one desired. A mismatch must be followed by a fetch of the block of data and its key from main memory 9.

Changing the key associated with the storage protect area specified by the SSK instruction would be accomplished in the manner as that described above. In this manner the affect of the retention of keys would be accomplished with relatively few key array locations per local buffer.

While the invention has been particularly shown and described with reference to the preferred embodiment thereof, it will be understood by those skilled in the art that various changes in form and details may be made therein without departing from the spirit and scope of the invention.

We claim:

1. In a multiprocessing system with a data storage hierarchy, a plurality of processors for processing data, a main memory connected to each of said plurality of processors and divided into a plurality of storage protect areas, a plurality of storage protect keys each of which is associated with one of said storage protect areas in main memory, and a plurality of apparatuses for retaining storage protect keys, wherein each said apparatus is connected to a corresponding one of said processors, and wherein each said apparatus comprises:

address receiving means connected to its corresponding processor for receiving addresses of data desired and instructions;

local high speed storage means connected to said main memory for retaining blocks of data stored in said main memory;

key array means connected to said address receiving means for retaining an entry for each of said blocks of data retained in said local storage means, each entry containing (a) the storage protect key corresponding to that block of data retained in said local storage means, and (b) a portion of the address corresponding to that block of data retained in said local storage means;

comparison means connected to said address receiving means and said key array means for comparing the portion of address in the key array entry with the corresponding portion of the address in said address receiving means; and means for accessing said key array means and said address receiving means to determine by the aforesaid comparing function whether the storage protect key associated with the data represented by the address in said address receiving means, is resident in said key array means.

2. The apparatus of claim 1 wherein means are provided to address a key array entry within said key array means by the portion of the address in the address receiving means less that portion resident in the key array entry.

3. The apparatus of claim 2 wherein the area of said main memory specified by the storage protect area of a set storage key instruction is the portion of the address that is utilized to identify said blocks of said main memory in said local storage means.

* * * * *

PO-1050
(5/69)

UNITED STATES PATENT OFFICE
CERTIFICATE OF CORRECTION

Patent No. 3,761,883 Dated September 25, 1973

Inventor(s) Joseph A. Alvarez; Robert P. Barner, Jr.; Robert J. Hallett

It is certified that error appears in the above-identified patent and that said Letters Patent are hereby corrected as shown below:

Column 5, line 46, after "art." delete the remainder of the column.

Column 6, lines 1-28, delete in their entirety.

Signed and sealed this 5th day of November 1974.

(SEAL)
Attest:

McCOY M. GIBSON JR.
Attesting Officer

C. MARSHALL DANN
Commissioner of Patents